(12) United States Patent
Aratani

(10) Patent No.: US 12,555,331 B2
(45) Date of Patent: Feb. 17, 2026

(54) INFORMATION PROCESSING APPARATUS

(71) Applicant: CANON KABUSHIKI KAISHA, Tokyo (JP)

(72) Inventor: Shinichi Aratani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 18/354,822

(22) Filed: Jul. 19, 2023

(65) Prior Publication Data

US 2024/0046584 A1 Feb. 8, 2024

(30) Foreign Application Priority Data

Aug. 4, 2022 (JP) ................................ 2022-124671

(51) Int. Cl.
*G06T 19/00* (2011.01)
(52) U.S. Cl.
CPC ................................ *G06T 19/006* (2013.01)
(58) Field of Classification Search
None
See application file for complete search history.

(56) References Cited

U.S. PATENT DOCUMENTS

| 7,652,679 | B2 | 1/2010 | Aratani | |
|---|---|---|---|---|
| 7,848,903 | B2 | 12/2010 | Aratani | |
| 7,860,345 | B2 | 12/2010 | Satoh | |
| 10,684,485 | B2 | 6/2020 | Stafford | |
| 11,263,813 | B2 | 3/2022 | Ohashi | |
| 2012/0092328 | A1* | 4/2012 | Flaks | ..................... G06V 20/10 345/419 |
| 2016/0260251 | A1 | 9/2016 | Stafford | |
| 2018/0182160 | A1* | 6/2018 | Boulton | .............. G02B 27/017 |
| 2022/0198763 | A1 | 6/2022 | Tanimori | |

FOREIGN PATENT DOCUMENTS

| JP | 2018-514017 A | 5/2018 |
|---|---|---|
| JP | 2022-152222 A | 10/2022 |

OTHER PUBLICATIONS

Marques et al., "Remote collaboration in maintenance contexts using augmented reality: insights from a participatory process", Jan. 11, 2022, International Journal on Interactive Design and Manufacturing, 419-438 (Year: 2022).*

* cited by examiner

*Primary Examiner* — Robert J Craddock
(74) *Attorney, Agent, or Firm* — Venable LLP

(57) ABSTRACT

An information processing apparatus according to the present invention is a client apparatus connected to a network, and includes: a receiver configured to receive first information, which is information on a virtual object, via the network; and a controller configured to acquire second information, which is information on environment of surrounding of the client apparatus, generate an image of the virtual object on a basis of the first information and the second information, and control so that the generated image of the virtual object is displayed on a display.

16 Claims, 8 Drawing Sheets

INFORMATION PROCESSING APPARATUS

BACKGROUND OF THE INVENTION

Field of the Invention

The present invention relates to an information processing apparatus, and more particularly to a technique to display a virtual object for generating a mixed reality or an augmented reality.

Description of the Related Art

As techniques to merge a real world and a virtual world in real-time, a mixed reality (MR) technique and an augmented reality (AR) technique are known. These techniques are techniques to merge a real space and a virtual space (virtual objects) created by a computer seamlessly. These techniques are expected to be applied to various fields, such as assembly support and surgery support. In the case of assembly support, a screen to indicate a procedure of the assembly operation or a state of actual operation (e.g., wiring) is displayed superimposed on the image of the real space. In the case of surgery support, a graphic indicating the state inside the body of the patient is displayed superimposed on the image of the body surface of the patient.

As a display device to make a user feel that a virtual object exists in a real space, a video see-through head mounted type display device and an optical see-through head mounted type display device are available. The head mounted type display device is a head mounted display (HMD), for example. In the case of the video see-through type, an image of a real space captured by an imaging apparatus (e.g., video camera) is displayed in real-time. Then an image of a virtual object is displayed superimposed on the image of the real space. In the case of the optical see-through type, the head mounted type display device includes lenses similar to the lenses of regular spectacles, and an image of a virtual object is projected onto the lenses, for example.

A system for a plurality of users sharing a virtual object via a network is also available. If such a system is used, an operation that a certain user performed on the virtual object is reflected on the virtual objects which other users are viewing, whereby the plurality of users can jointly perform an operation on the virtual object.

Japanese Translation of PCT Application No. 2018-514017 discloses a client system which downloads content via the Internet, renders the content, and displays the received content on the HMD.

In a system for virtual reality (VR), the user views a virtual object disposed on a virtual space which is unrelated to a real space. Therefore the virtual object can be viewed in the same way among the plurality of users.

In a system for MR or AR, on the other hand, the user views a virtual object disposed in a real space. Therefore if environment of the surroundings (real spaces) of the plurality of users are different, deviation is generated among the plurality of users in how the virtual object is viewed. Specifically, an optical deviation is generated between the views of the real space and the virtual object, and this deviated amount is different among the plurality of users. As a result, a deviation is generated in the impression received from the virtual object among the plurality of users, which makes it difficult to perform an operation and a sensory evaluation appropriately. Further, if the real space and the virtual object do not match optically, the user experiences a sense of discomfort.

SUMMARY OF THE INVENTION

The present invention provides a technique for a plurality of users at different locations to view a virtual object appropriately.

The present invention in its first aspect provides an information processing apparatus that is a client apparatus connected to a network, including: a receiver configured to receive first information, which is information on a virtual object, via the network; and a controller configured to acquire second information, which is information on environment of surrounding of the client apparatus, generate an image of the virtual object on a basis of the first information and the second information, and control so that the generated image of the virtual object is displayed on a display.

The present invention in its second aspect provides an image processing apparatus that is a server apparatus connected to a network, including: a receiver configured to receive second information, which is information on environment of surrounding of a client apparatus connected to the network, via the network; a controller configured to generate an image of a virtual object on a basis of on the second information; and a transmitter configured to transmit the image of the virtual object generated by the controller to the client apparatus via the network.

The present invention in its third aspect provides a control method of a client apparatus connected to a network, including: receiving first information, which is information on a virtual object, via the network; acquiring second information, which is information on environment of surrounding of the client apparatus; generating an image of the virtual object on a basis of the first information and the second information; and controlling so that the generated image of the virtual object is displayed on a display.

The present invention in its fourth aspect provides a non-transitory computer readable medium that stores a program, wherein the program causes a computer to execute the above described control method.

Further features of the present invention will become apparent from the following description of exemplary embodiments with reference to the attached drawings.

DESCRIPTION OF THE EMBODIMENTS

Embodiment 1

Embodiment 1 of the present invention will be described. In Embodiment 1, an example of applying the present invention to an information processing apparatus, which is externally connected to a head mounted display (HMD), will be displayed. The information processing apparatus, to which the present invention is applied in Embodiment 1, is a later mentioned client apparatus, such as a controller or a personal computer (PC).

The information processing apparatus may be embedded in the HMD. This means that the present invention is also applicable to an HMD, which is a type of head mounted type display device. The present invention is also applicable to other head mounted type display devices. For example, a handheld type display device, which the user holds and attaches (applies) to the head, is a type of head mounted type display device. The present invention is also applicable to the handheld type display device. The handheld display device is a smartphone or a tablet, for example. Smart glasses (augmented reality (AR) glasses) is also a type of head mounted type display device, and the present invention is also applicable to smart glasses. The present invention is applicable to both a head mounted type display device in which the user views images with both eyes, and a head mounted type display device in which the user views images with one eye. A smartphone mounted to a head mounted adaptor (e.g., virtual reality (VR) goggles) is a type of a head mounted type display device. Besides the head mounted type display device, the present invention is also applicable to a different type of display device (e.g., stationary type display device). The present invention is also applicable to an information processing system that includes the information processing apparatus. And the present invention is also applicable to the later mentioned server apparatus.

The present invention is applicable to both a video see-through type device and an optical see-through type device. In the case of the video see-through type device, an image of a real space (outer world) captured by an imaging apparatus (e.g., video camera) is displayed on a display surface (display surface which does not transmit the light from the real space) in real-time. Then a graphic (e.g., image of a virtual object) is displayed superimposed on (combined with) the image of the real space. In this case, the user cannot view the real space directly but can indirectly view the real space or the graphic superimposed on the image of the real space by viewing the displayed image. In the case of the optical see-through type device, a graphic (e.g., image of a virtual object) is displayed on a display surface (display surface which transmits through the light from the real space (outer world)), for example. In this case, the user can directly view the real space (outer world) via the display surface, or can view the graphic displayed on the display surface.

Figure 1:
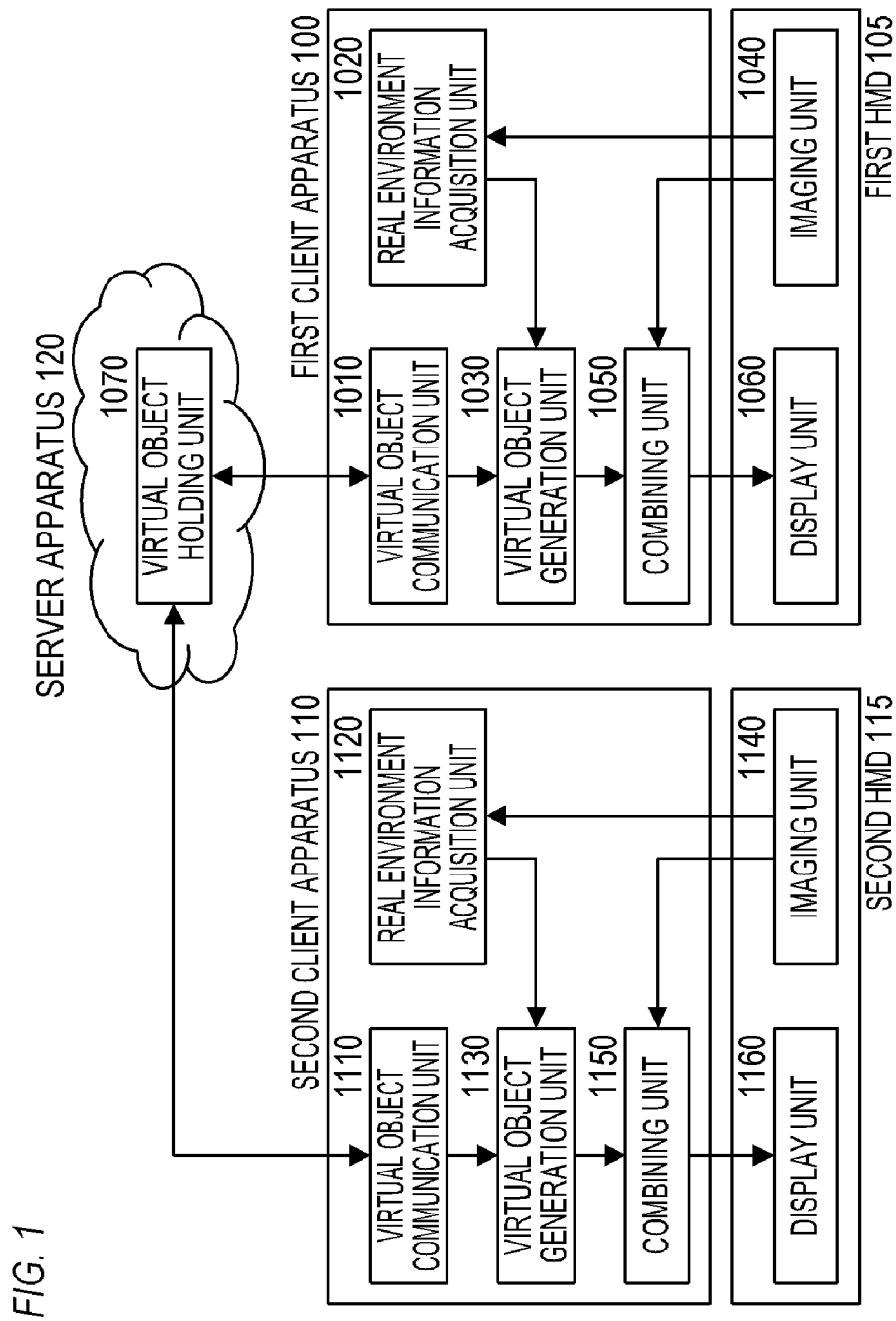
FIG. 1 is a functional block diagram of an information processing system according to Embodiment 1.

FIG. 1 is a functional block diagram of an information processing system according to Embodiment 1. The information processing system in FIG. 1 includes a server apparatus 120, a first client apparatus 100, a second client apparatus 110, a first HMD 105, and a second HMD 115. The first HMD 105 and the second HMD 115 are video see-through type HMDs respectively. The first client apparatus 100 and the second client apparatus 110 are connected to the server apparatus 120 via a network, the first HMD 105 is connected to the first client apparatus 100, and the second HMD 115 is connected to the second client apparatus 110. A number of client apparatuses may be more than 2. And a number of HMDs may also be more than 2.

The first client apparatus 100 can display an image of the real space on the first HMD 105, and can also display an image of a virtual object superimposed on (combined with) the image of the real space. A user of the first client apparatus 100 (first user) can wear the first HMD 105 and perform operation (control) on the virtual object while viewing the virtual object. In the same manner, the second client apparatus 110 can display an image of the real space on the second HMD 115, and can also display an image of a virtual object superimposed on (combined with) the image of the real space. The user of the second client apparatus 110 (second user) can wear the second HMD 115 and perform operation (control) on the virtual object while viewing the virtual object. The first client apparatus 100 and the second client apparatus 110 can share the virtual object via a network.

The server apparatus 120 includes a virtual object holding unit 1070. The virtual object holding unit 1070 holds virtual object information. The virtual object information is information on the virtual object. For example, the virtual object information includes a shape of the virtual object, a position of the virtual object, and a texture of the surface of the virtual object. Further, the virtual object information includes an environment map, which indicates a position of a virtual light source (light source which illuminates the virtual object) intensity of the virtual light source, color temperature of the virtual light source, and environment of the surrounding of the virtual object. The virtual object information also includes exposure information on a virtual camera (camera which captures an image of the virtual object). In the first client apparatus 100, an image corresponding to an image acquired by the virtual camera is generated as an image of the virtual object, based on the assumption that the virtual camera captures an image of the virtual object illuminated by the virtual light source.

The first HMD 105 includes an imaging unit 1040 and a display unit 1060. The imaging unit 1040 is an image sensor that images (captures) the surrounding of the first HMD 105. The surrounding of the first HMD 105 may be regarded as the surrounding of the first client apparatus 100. The imaging unit 1040 may be embedded in the first HMD 105, or may be removable from the first HMD 105. The imaging unit 1040 is a video camera or a digital camera, for example. The imaging unit 1040 may be a stereo camera which is configured to perform imaging in 2 directions: a direction closer to a visual axis of the left eye, and a direction closer to a visual axis of the right eye. The display unit 1060 displays an image (video) based on the image data (video data) outputted from the first client apparatus 100. The display unit 1060 is a compact liquid crystal display or a compact organic EL display, for example. An image displayed on the display unit 1060 is magnified by a lens disposed in the first HMD 105, and the first user wearing the first HMD 105 views the magnified image.

The first client apparatus 100 includes a virtual object communication unit 1010, a real environment information acquisition unit 1020, a virtual object generation unit 1030, and a combining unit 1050.

The virtual object communication unit 1010 communicates with the server apparatus 120 via a network. The communication, for example, is a wired local area network (LAN) communication, a wireless LAN communication, a Wi-Fi® communication, a Bluetooth® communication or an infrared communication. The virtual object communication unit 1010 receives (acquires) virtual object information from the virtual object holding unit 1070 of the server apparatus 120 via the network. If the virtual object information is updated in the first client apparatus 100, the virtual object communication unit 1010 sends the updated virtual object information to the virtual object holding unit 1070 of the server apparatus 120 via the network. The virtual object information held by the virtual object holding unit 1070 is updated by the virtual object information sent from the virtual object communication unit 1010.

The real environment information acquisition unit 1020 also acquires the real environment information on the environment of the surrounding (real space) of the first client apparatus 100. The method for acquiring the real environment information will be described in detail later.

The virtual object generation unit 1030 generates a virtual object image (image of a virtual object) based on the virtual object information acquired by the virtual object communication unit 1010 and the real environment information acquired by the real environment information acquisition unit 1020. The method for generating the virtual object image will be described in detail later.

The combining unit 1050 acquires the real space image capturing the surrounding of the first client apparatus 100 from the imaging unit 1040 of the first HMD 105 (image acquisition). The real space image is an image of the real space, and is a moving image, for example. Further, the combining unit 1050 controls so that the virtual object image generated by the virtual object generation unit 1030 is displayed on the display unit 1060 of the first HMD 105. In Embodiment 1, the combining unit 1050 controls so that the combined image, where the virtual object image generated by the virtual object generation unit 1030 is superimposed on (combined with) the acquired real space image, is displayed on the display unit 1060. For example, the combining unit 1050 generates a combined image by superimposing the virtual object image on the real space image, and outputs the combined image (data thereof) to the first HMD 105.

The second HMD 115 has a configuration similar to the first HMD 105. Just like the first HMD 105, the second HMD 115 includes an imaging unit 1140 and a display unit 1160. The second client apparatus 110 has a configuration similar to the first client apparatus 100. Just like the first client apparatus 100, the second client apparatus 110 includes a virtual object communication unit 1110, a real environment information acquisition unit 1120, a virtual object generation unit 1130, and a combining unit 1150.

As mentioned above, a display device other than an HMD may be used. For example, a real space may be imaged by a universal serial bus (USB) camera, and the combined image may be displayed on a display different from the imaging unit. Further, a real space maybe imaged by a camera embedded in a laptop PC, and a combined image may be displayed on a display of the laptop PC. Furthermore, a real space may be imaged by a camera embedded in a tablet PC, and a combined image may be displayed on a display of a tablet PC.

Figure 2:
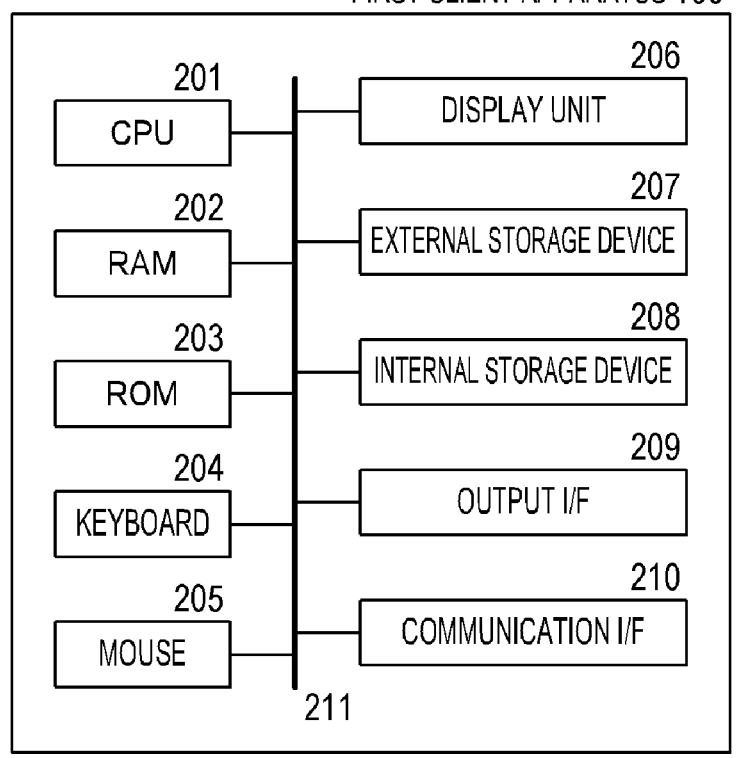
FIG. 2 is a hardware block diagram of a client apparatus according to Embodiment 1.

FIG. 2 is a hardware block diagram of the first client apparatus 100. The first client apparatus 100 includes: a CPU 201, a RAM 202, a ROM 203, a keyboard 204, a mouse 205, a display unit 206, an external storage device 207, an internal storage device 208, an output I/F 209, and a communication I/F 210. These components are interconnected via a bus 211. As mentioned above, the second client apparatus 110 has a configuration similar to the first client apparatus 100.

The central processing unit (CPU) 201 controls each component of the first client apparatus 100. The read only memory (ROM) 203 stores various information in advance. For example, the ROM 203 stores a program of an operating system (OS), a program of a device driver, and programs of processing related to Embodiment 1. The random access memory (RAM) 202 temporarily stores various information. The CPU 201 develops a program, which is stored in the ROM 203, in the RAM 202, and executes the program.

The keyboard 204 and the mouse 205 each is an operation unit (input interface (I/F)) to receive operation (instruction) from a first user. The first user performs various operations (e.g., operation on a virtual object) using at least one of the keyboard 204 and the mouse 205. The keyboard 204 and the mouse 205 each output an operation signal in accordance with an operation (instruction) from the first user, and the CPU 201 performs the processing in accordance with the operation signal. The keyboard 204 and the mouse 205 each may or may not be removable from the first client apparatus 100.

The display unit 206 displays various images. The display unit 206 may or may not be removable from the first client apparatus 100. The external storage device 207 is a storage device to store various information, and is removable from the first client apparatus 100. The internal storage device 208 is a storage device to store various information, and is embedded in the first client apparatus 100.

The output I/F 209 is used to output image data to an external apparatus (e.g., first HMD 105). The output I/F 209 may also be used to acquire information from the external apparatus. The communication I/F 210 is used to communicate with an external apparatus (e.g., server apparatus 120).

The virtual object communication unit 1010, the real environment information acquisition unit 1020, the virtual object generation unit 1030, and the combining unit 1050 in FIG. 1 are implemented by the CPU 201. For example, the CPU 201 communicates with the server apparatus 120 via the communication I/F 210 (and the network), so as to implement the virtual object communication unit 1010. The CPU 201 acquires a real space image from the first HMD 105 via the output I/F 209, so as to implement the combining unit 1050. Then the CPU 201 generates a combined image, and outputs the combined image to the first HMD 105 via the output I/F 209.

The CPU 201 also updates the virtual object information received from the virtual object holding unit 1070 of the server apparatus 120. For example, when the first user performs an operation on a virtual object and the state of the virtual object (e.g., shape of the virtual object, position of the virtual object or texture of the surface of the virtual object) changes, the CPU 201 updates the virtual object information so as to reflect this change.

The hardware configuration of the second client apparatus 110 is also similar to the first client apparatus 100. Just like the first client apparatus 100, the server apparatus 120 includes a CPU, a RAM and a ROM.

Figure 3:
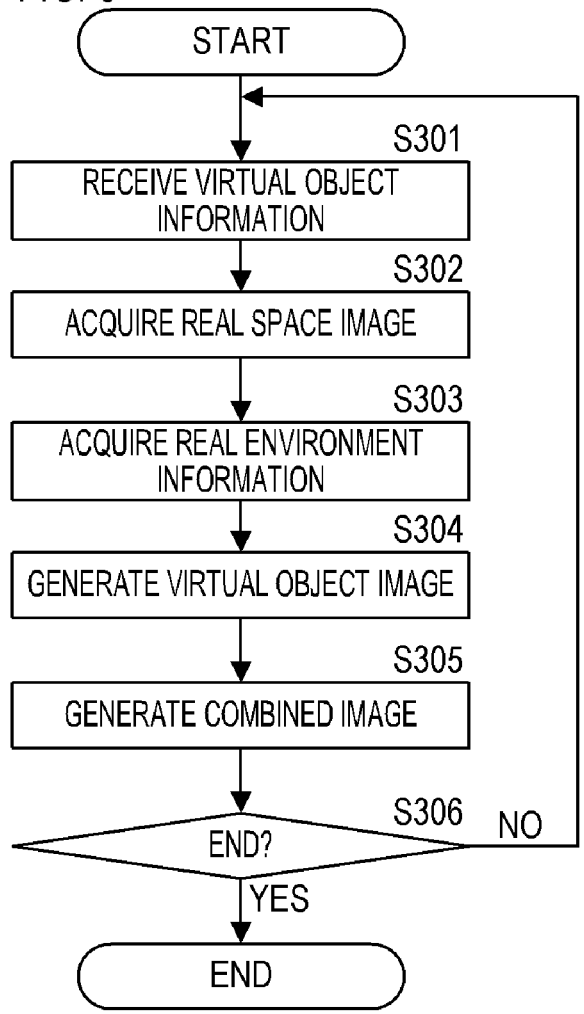
FIG. 3 is a flow chart depicting processing of the client apparatus according to Embodiment 1.

FIG. 3 is a flow chart depicting processing of the first client apparatus 100. The processing in FIG. 3 is implemented by the CPU 201 developing a program, which is stored in the ROM 203, in the RAM 202, and executing the program. For example, when the first user performs an operation (executes an instruction) to display a virtual object on the first client apparatus 100, the processing in FIG. 3 starts.

In step S301, the virtual object communication unit 1010 receives the virtual object information from the virtual object holding unit 1070 of the server apparatus 120 via the network. This virtual object information is virtual object information generated or updated by the second client apparatus 110, for example.

In step S302, the combining unit 1050 acquires a real space image capturing the surrounding of the first client apparatus 100 from the imaging unit 1040 of the first HMD 105.

In step S303, the real environment information acquisition unit 1020 acquires the real environment information on the environment of the surrounding (real space) of the first client apparatus 100. This real environment information includes at least one of: a position of a light source in the environment of the surrounding of the first client apparatus 100, an intensity of the light source, a color temperature of the light source, an environment map indicating the environment, a luminance of the environment, exposure information on the imaging unit 1040, and a real space image acquired by the imaging unit 1040.

The real environment information is acquired based on the real space image acquired in step S302. In the real environment information, the environment of the real space may or may not be reflected in real-time. The real environment information may be acquired based on the real space image stored in the storage device (e.g., external storage device 207 or in the internal storage device 208) in advance.

For example, the position of the light source may be acquired (determined) based on the position of the high brightness region in the real space image. The intensity of the light source may be acquired (determined) based on the brightness value of the high brightness region in the real space image. The color temperature of the light source, the luminance of the environment, and the exposure information of the imaging unit 1040 may be acquired from the imaging unit 1040 as auxiliary information, along with the real space image. The color temperature of the light source may be acquired (determined) based on the color information (e.g., balance of R value, G value and B value) of the real space image. The luminance of the environment may be acquired based on the brightness value of the entire real space image. The intensity of the light source and the luminance of the environment each may be acquired using an illuminometer. The environment map is an omnidirectional high dynamic range (HDR) image capturing the 360° range around the first client apparatus 100, for example. The environment map may or may not be acquired based on a plurality of real space images capturing different directions. The environment map may be acquired using the imaging unit 1040, or may be acquired using a camera different from the imaging unit 1040. The environment map may be acquired using a camera of which the image capturing range (angle-of-view) is narrower than 360°, or may be acquired using a 360° camera. The environment map may or may not be provided in advance. Further, the environment map may be generated by instructing the first user wearing the first HMD 105 to look in a plurality of directions, and combining a plurality of real space images (a plurality of real space images corresponding to the plurality of directions respectively) acquired by the imaging unit 1040. Furthermore, the environment map may be generated by combining a plurality of real space images in the background while the first user is viewing a video displayed on the first HMD 105.

The real environment information acquired in step S303 is not limited to the above mentioned information, but may be any information related to the environment of the surrounding of the first client apparatus 100. Also the method of acquiring the real environment information is not especially limited.

In step S304, the virtual object generation unit 1030 generates a virtual object image based on the virtual object information acquired in step S301 and the real environment information acquired in step S303. For example, the virtual object generation unit 1030 adjusts (updates) the virtual object information based on the real environment information, and generates the virtual object image by performing rendering based on the virtual object information after adjustment. In Embodiment 1, the virtual object information includes the same type of information as the real environment information. The virtual object generation unit 1030 replaces (overwrites) at least a part of the virtual object information with the real environment information, and performs rendering based on the virtual object information after the replacement.

If the real environment information cannot be acquired in step S303, the virtual object generation unit 1030 generates the virtual object image based on the virtual object information acquired in step S301 without using the real environment information. In the case where the real environment information cannot be acquired in step S303, the virtual object generation unit 1030 may use the real environment information acquired in the past (e.g., the previous time).

The virtual object generation unit 1030 may paste, as a reflection image, an environment map included in the real environment information, on the surface inside a virtual sphere or virtual cube enveloping the virtual object, so as to express a pseudo-state where an environment of the surrounding is reflected on the surface of the virtual object. According to this method, the reflection can be expressed (calculated) more quickly (with less processing volume) than the ray-tracing method. The virtual object generation unit 1030 may also express (calculate) the reflection by the ray-tracing method using the light source information (e.g., position of the light source, intensity of the light source, and color temperature of the light source) included in the real environment information and the environment map. In this case, using the environment map, the virtual object generation unit 1030 generates a three-dimensional model simulating the real space (three-dimensional model on which the virtual space, such as the environment map (image of the real space) is pasted as texture), for example. Then using the light source information, reflection of the three-dimensional model on the virtual object is expressed (calculated) by the ray-tracing method. In the ray-tracing method, various phenomena, which may be generated in the real space, are calculated, and a more realistic reflection can be expressed. For example, in the ray-tracing method, refraction and reflection of the light that occur on the surface of water or object are calculated based on the quantity and direction of the light.

The virtual object generation unit 1030 may acquire the position and the attitude of the imaging unit 1040, and set the position and the attitude as the position and the attitude of the virtual camera. Thereby the virtual object image can be rendered so that the real space and the virtual object match geometrically. The position and the attitude of the imaging unit 1040 may be acquired (estimated) by any method. For example, "simultaneous localization and mapping" (SLAM) may be used, where the feature points are detected from a captured image (image captured by the imaging unit 1040), and the self-position and a map of the feature points are simultaneously estimated. Further, a method of detecting an index, of which position in the real space is known, from the captured image, may be used. Furthermore, when parameters unique to the camera, such as focal distance and frustrum, are known and the feature points or indexes are detected from the captured image, distortion of the captured image may be corrected using the parameters unique to the camera. An optical or magnetic sensor may be used, or an inertial measurement unit (IMU) may also be used. In the case of using the sensor, information on the positional relationship between the sensor and the imaging unit 1040 is provided in advance.

In step S305, the combining unit 1050 generates a combined image by combining (superimposing) the virtual object image generated in step S304 on the real space image acquired in step S302. Then the combining unit 1050 outputs the generated combined image (data thereof) to the first HMD 105. The display unit 1060 of the first HMD 105 displays the combined image based on the data of the combined image outputted from the combining unit 1050.

The combining unit 1050 may acquire the depth information of the real space (e.g., distance from the imaging unit 1040). The method for acquiring the depth information is not especially limited. Then the combining unit 1050 may compare the depth information of the virtual object (e.g., distance from the virtual camera) and the depth information of the real space, and generate a combined image so that the real object (object in the real space) or the virtual object, whichever is located at the front, is displayed. Thereby the front-back relationship of the real object and the virtual object can be expressed correctly.

In step S306, the CPU 201 determines whether the processing in FIG. 3 ended. For example, in the case where the first user performed an operation (executed an instruction) to hide the virtual object (end display of the virtual object) in the first client apparatus 100, the CPU 201 determines that the processing in FIG. 3 ends. Unless such an operation is performed, the CPU 201 determines that the processing in FIG. 3 does not end. The CPU 201 ends the processing in FIG. 3 if it is determined that the processing in FIG. 3 ends, or returns the processing to step S301 if it is determined that the processing in FIG. 3 does not end.

As described above, according to Embodiment 1, the environment of the surrounding of the client apparatus is considered when the client apparatus generates a virtual object image. Thereby a plurality of users at different locations can view the virtual object appropriately (without feeling a sense of discomfort). For example, even if the environment of the surrounding (real space) is different among the plurality of users, no major optical deviation is generated in the view between the real space and the virtual object. As a result, there is no major deviation in the impression received from the virtual object among a plurality of users, and each user can perform an operation and a sensory evaluation appropriately.

Modification 1-1

In Embodiment 1 described above, the virtual object generation unit 1030 adjusts the virtual object information based on the real environment information, and generates the virtual object image based on the virtual object information after the adjustment. However, the method for generating the virtual object image is not limited to this example. For example, the virtual object generation unit 1030 may generate the virtual object image based on the virtual object information received from the server apparatus 120 without adjusting the virtual object information, and perform image processing on the virtual object image based on the real environment information. Then the combining unit 1050 may control so that the virtual object image after the image processing is displayed on the display unit 1060 of the first HMD 105.

The image processing is not especially limited. For example, the virtual object generation unit 1030 may change the luminance (brightness value) of the virtual object image in accordance with the luminance of the environment included in the real environment information. The brightness value of the virtual object image can be increased to brighten the virtual object image, and the brightness value of the virtual object image can be decreased to darken the virtual object image. The virtual object generation unit 1030 may change the brightness value of a part of the virtual object image in accordance with the position and intensity of the light source included in the real environment information. Further, the virtual object generation unit 1030 may change a tinge (e.g., balance of R value, G value and B value) of the virtual object image in accordance with the color temperature of the light source included in the real environment information.

In Modification 1-1 as well, the environment of the surrounding of the client apparatus is considered when the client apparatus generates a virtual object image. Thereby an effect similar to Embodiment 1 can be implemented.

Modification 1-2

In Embodiment 1, the real environment information is acquired (and a virtual object image is generated and combined image is generated) at an image capturing rate of the real space image (frame rate of moving image of real space image). However, a high spec arithmetic unit is required to acquire the real environment information at high frequency, which increases manufacturing cost. Hence the real environment information acquisition unit 1020 may acquire the real environment information at lower frequency than the image capturing rate of the real space image. For example, the real environment information acquisition unit 1020 may acquire the real environment information at a frequency or at a timing in accordance with the instruction from the first user. In the case of indoors where the light source is constant, the change of environment of the real space is assumed to be sufficiently small, hence the real environment information acquisition unit 1020 may acquire the real environment information only once. For example, the real environment information acquisition unit 1020 may acquire the real environment information only when the first client apparatus 100 starts up. The real environment information acquisition unit 1020 may also acquire the real environment information at a timing when the environment of the surrounding (real space) of the first client apparatus 100 is changed. Further, the real environment information acquisition unit 1020 may acquire the real environment information during a period where it is determined that the environment of the surrounding of the first client apparatus 100 is different from the environment of the surrounding of the second client apparatus 110.

According to Modification 1-2, a number of times of acquiring the real environment information can be decreased. Thereby such effects as reduction of the processing load, processing time and manufacturing cost can be obtained.

Modification 1-3

In Embodiment 1 described above, the virtual object generation unit 1030 generates the virtual object image based on the real environment information and the virtual object information. However, the virtual object generation unit 1030 may generate the virtual object image based on the virtual object information received from the server apparatus 120 without using the real environment information.

The server apparatus 120 may include a receiving unit that receives the real environment information from the client apparatus via a network. The server apparatus 120 may include a holding unit that holds the real environment information of the client apparatus in association with an ID (identification information) of this client apparatus. Furthermore, the server apparatus 120 may include a control unit that controls so as to perform a predetermined notification to the first user in a case where a difference between the real environment information of the first client apparatus 100 and the real environment information of the second client apparatus 110 is larger than a threshold (predetermined value). For example, the control unit sends the first client apparatus 100 an instruction (control signal) to perform the predetermined notification to the first user. According to the instruction (control signal) outputted from the server apparatus 120, the CPU 201 of the first client apparatus 100 controls so as to perform the predetermined notification to the first user. Here the control unit of the server apparatus 120 may control so as to perform the predetermined notification to the first user and the second user, or may control so as to perform the predetermined notification only to the first user. The user(s) who received the predetermined notification can recognize that the environment of the real space is different from the other user. The notification method is not especially limited. For example, the notification may be displayed as a text, an icon or may be outputted as a sound.

According to Modification 1-3, the user can recognize that the environment of the real space is different from that of the other user by the predetermined notification. Thereby it is expected that the user can perform operation and sensory evaluation appropriately considering the difference in the environment of the real space. The predetermined notification may be a notification indicating only that the environment of the real space is different from that of the other user, or may be a notification indicating details of the difference of the respective environment of the real space. For example, it may notify a user that this user is viewing a virtual object under a white light illumination while the other user is viewing the virtual object under a yellow light illumination. By being notified on the details of the difference of the environment of the real space, the user can image how the other user is viewing the virtual object, and can perform an operation and sensory evaluation more appropriately.

In a case where there are 3 or more users (in a case where there are 3 or more client apparatuses), the control method thereof is not especially limited. For example, the control unit of the server apparatus 120 may compare a representative value (e.g., maximum value, average value, median value, mode value or minimum value) of the difference between two real environment information with a threshold. Then the control unit may control so as to perform a predetermined notification to all the users if there is a difference that is larger than the threshold. The control unit may control so as to perform a predetermined notification to at least one of the two users (two client apparatuses) corresponding to the two real environment information of which difference acquired is larger than the threshold. Further, the control unit may compare a dispersion (e.g., standard deviation) of all the real environment information with a threshold. Then the control unit may control so as to perform a predetermined notification to all the users if the dispersion is larger than the threshold.

Modification 1-4

In Modification 1-3 described above, the virtual object generation unit 1030 generates the virtual object image without using the real environment information, but the virtual object generation unit 1030 may use the real environment information to generate the virtual object image if necessary. For example, in a case where the difference between the real environment information of the first client apparatus 100 and the real environment information of the second client apparatus 110 is larger than a threshold (predetermined value), the server apparatus 120 may instruct the first client apparatus 100 to use the real environment information. Then the first client apparatus 100 may use the real environment information only when this instruction is received from the server apparatus 120. The predetermined notification may or may not be performed in Modification 1-4.

According to Modification 1-4, the real environment information is used if necessary when the virtual object image is generated. Therefore compared with the configuration where the real environment information is in constant use, processing load can be reduced.

Modification 1-5

Figure 8:
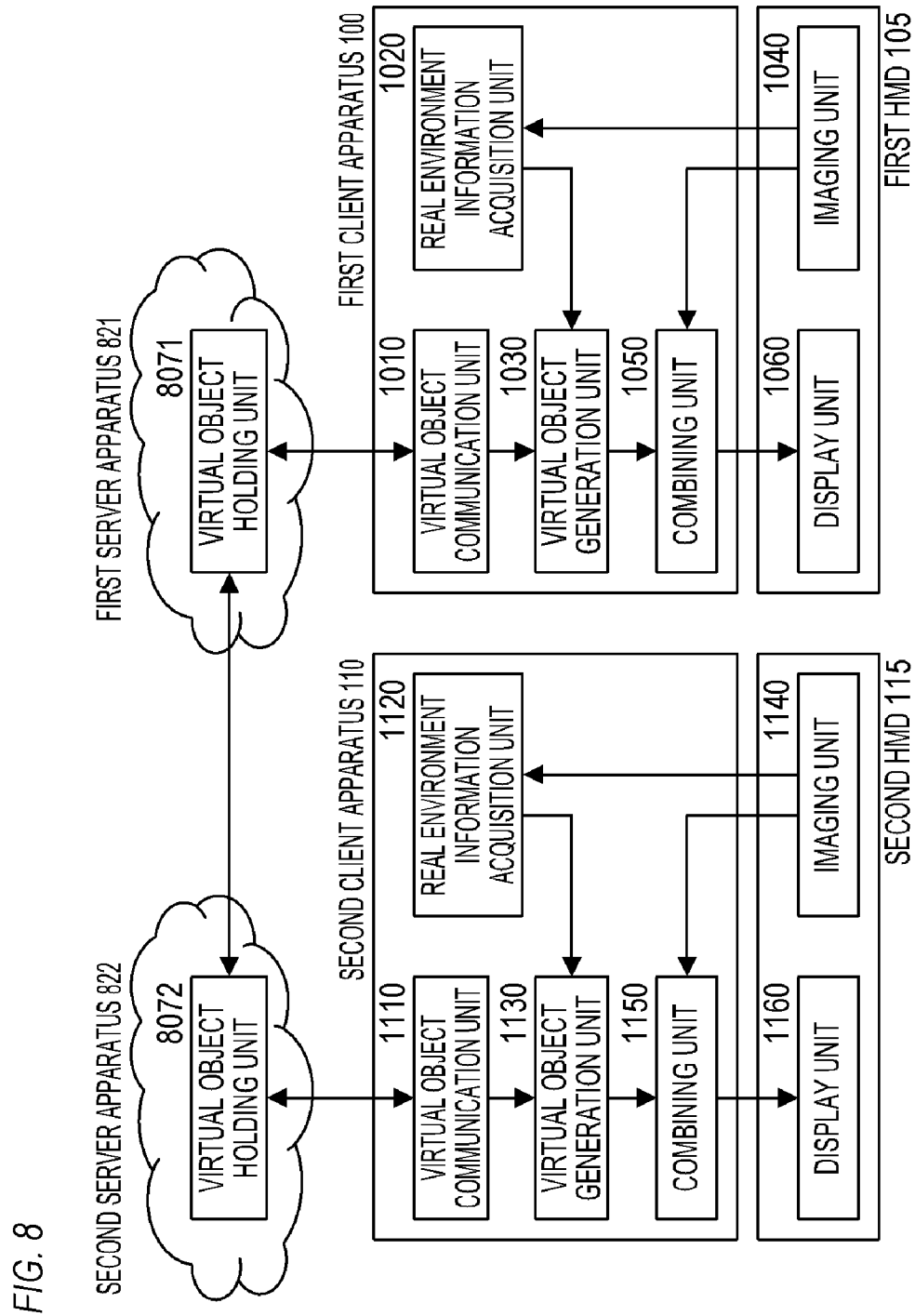
FIG. 8 is a modification of the functional block diagram of the information processing system.

In Embodiment 1 described above, one server apparatus 120 is used. However, a plurality of server apparatuses may be used, and a number of server apparatuses to be used is not especially limited. For example, as indicated in FIG. 8, the information processing system may include two server apparatuses 821 and 822. The server apparatus 821 includes a virtual object holding unit 8071 which is similar to the virtual object holding unit 1070, and the server apparatus 822 includes a virtual object holding unit 8072 which is also similar to the virtual object holding unit 1070. The virtual object holding unit 8071 and the virtual object holding unit 8072 communicate with each other so as to share virtual object information (store the same virtual object information). The other configuration of Modification 1-5 is the same as Embodiment 1.

In Modification 1-5 as well, a similar effect as Embodiment 1 can be obtained. Furthermore, the processing of the server apparatus 120 of Embodiment 1 can be shared by a plurality of server apparatuses, so as to reduce the processing load of one server apparatus.

Embodiment 2

Embodiment 2 of the present invention will be described. In the following, description of aspects the same as Embodiment 1 (e.g., configuration and processing the same as Embodiment 1) will be omitted, and aspects different from Embodiment 1 will be described.

In Embodiment 1 described above, the client apparatus renders the virtual object image. However, the computing load of rendering is high, and each client apparatus requires an expensive graphics processing unit (GPU) having high arithmetic processing capacity. Hence in Embodiment 2, the server apparatus renders the virtual object image. Thereby the processing load, the processing time, and the manufacturing cost of the client apparatus can be reduced. This configuration is called "remote rendering" or "cloud rendering". The client apparatus acquires the virtual object (data thereof) generated by the server apparatus from the server apparatus.

Figure 4:
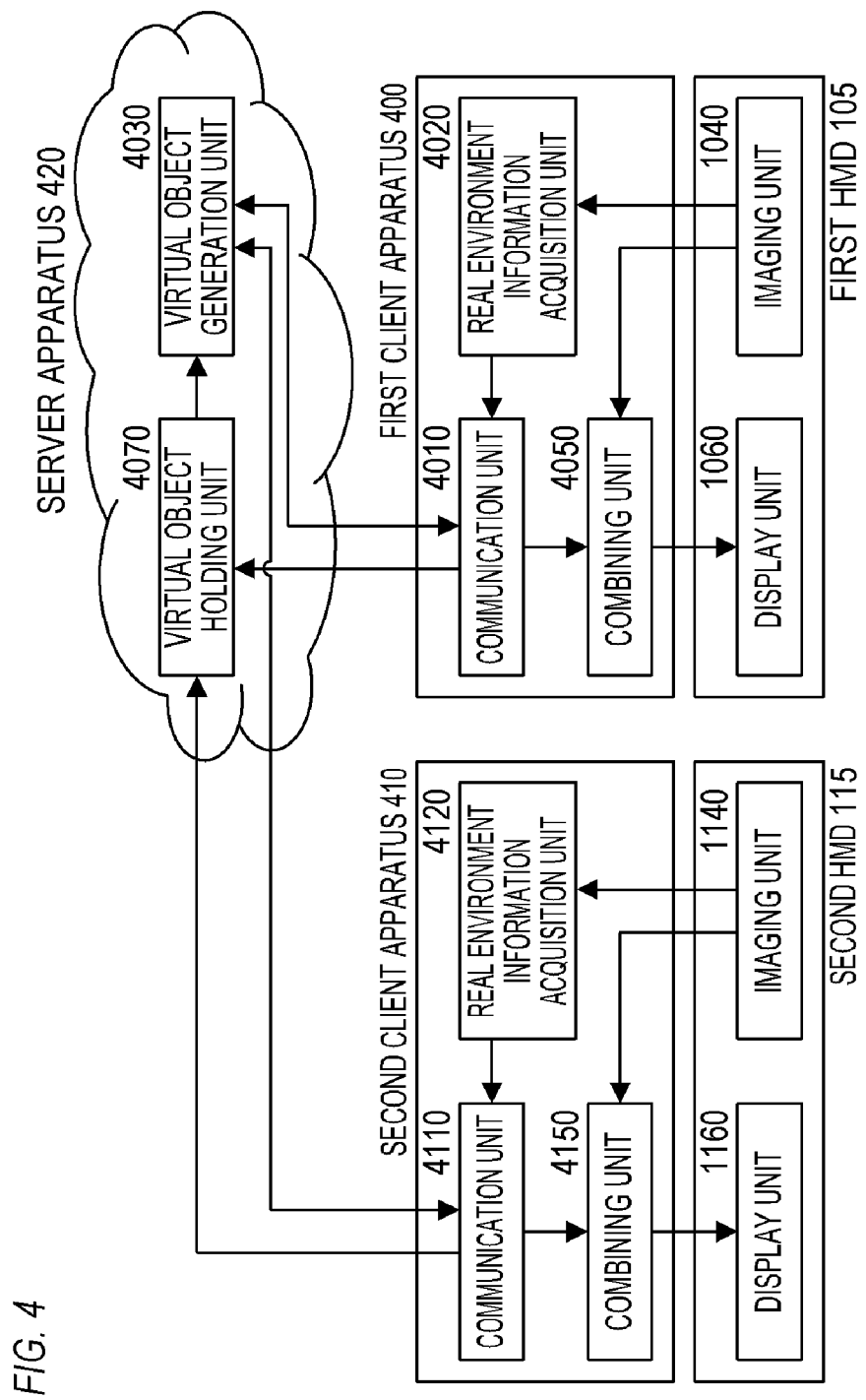
FIG. 4 is a functional block diagram of an information processing system according to Embodiment 2.

FIG. 4 is a functional block diagram of an information processing system according to Embodiment 2. The information processing system in FIG. 4 includes a server apparatus 420, a first client apparatus 400, a second client apparatus 410, the first HMD 105, and the second HMD 115.

The server apparatus 420 includes a virtual object holding unit 4070 and a virtual object generation unit 4030. The virtual object holding unit 4070 has a function similar to the virtual object holding unit 1070 of Embodiment 1. The virtual object generation unit 4030 receives the real environment information from the client apparatus via a network. When the real environment information is received from the client apparatus, the virtual object generation unit 4030 also receives an ID (identification information) of this client apparatus, and holds the real environment information in association with the ID. The virtual object generation unit 4030 generates a virtual object image based on the virtual object information held by the virtual object holding unit 4070 and the real environment information received from the client apparatus. Then the virtual object generation unit 4030 sends the generated virtual object image to the client apparatus via the network. The client apparatus, to which the virtual object image is sent, is the client apparatus having the ID associated with the real environment information used for generating this virtual object image.

The first client apparatus 400 includes a communication unit 4010, a real environment information acquisition unit 4020, and a combining unit 4050. The real environment information acquisition unit 4020 has a function similar to the real environment information acquisition unit 1020 of Embodiment 1, and the combining unit 4050 has a function similar to the combining unit 1050 of Embodiment 1. The communication unit 4010 communicates with the server apparatus 420 via the network, just like the virtual object communication unit 1010 of Embodiment 1. The communication unit 4010 sends the real environment information acquired by the real environment information acquisition unit 4020 and the ID of the first client apparatus 400 to the virtual object generation unit 4030 of the server apparatus 420 via the network. Further, when the first user performs an operation on the virtual object and the state of the virtual object changes, the communication unit 4010 sends the information on the state after the change (at least a part of the virtual object information) to the virtual object holding unit 4070 of the server apparatus 420 via the network. The virtual object information held by the virtual object holding unit 4070 is updated based on the information sent from the communication unit 4010.

The second client apparatus 410 has a configuration similar to the first client apparatus 400. Just like the first client apparatus 400, the second client apparatus 410 includes a communication unit 4110, a real environment information acquisition unit 4120, and a combining unit 4150.

Figure 5:
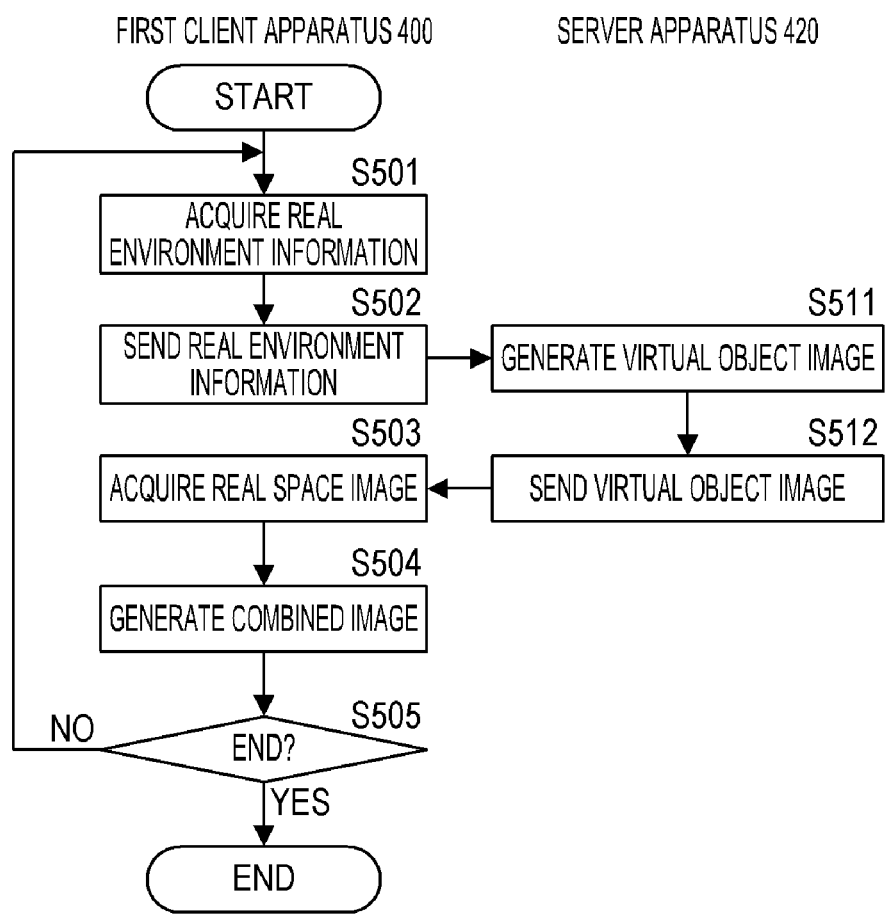
FIG. 5 is a flow chart depicting processing of the information processing system according to Embodiment 2.

FIG. 5 is a flow chart depicting processing of the information processing system according to Embodiment 2. The processing steps in S501 to S505 are processing steps performed by the first client apparatus 400, and are implemented by the CPU 201 of the first client apparatus 400 developing a program, which is stored in the ROM 203, in the RAM 202, and executing the program. The processing steps in S511 and S512 are processing steps performed by the server apparatus 420, and are implemented by the CPU of the server apparatus 420 developing a program, which is stored in the ROM, in the RAM, and executing the program. For example, when the first user performs an operation (executes an instruction) to display a virtual object on the first client apparatus 400, the processing in FIG. 5 starts.

In step S501, the real environment information acquisition unit 4020 acquires the real environment information on the environment of the surrounding (real space) of the first client apparatus 400.

In step S502, the communication unit 4010 sends the real environment information acquired in step S501 and the ID of the first client apparatus 400 to the virtual object generation unit 4030 of the server apparatus 420 via the network.

In step S511, the virtual object generation unit 4030 generates a virtual object image based on the virtual object information held by the virtual object holding unit 4070 and the real environment information sent from the first client apparatus 400 in step S502. The virtual object information held by the virtual object holding unit 4070, for example, is virtual object information generated or updated by the second client apparatus 410. The method for generating the virtual object image is similar to that of Embodiment 1. For example, the virtual object generation unit 4030 adjusts (updates) the virtual object information based on the real environment information, and generates the virtual object image by performing rendering based on the virtual object information after the adjustment.

In step S512, the virtual object generation unit 4030 sends the virtual object image generated in step S511 to the communication unit 4010 of the first client apparatus 400 via the network in accordance with the ID sent from the first client apparatus 400 in step S502.

In step S503, the combining unit 4050 acquires the real space image capturing the surrounding of the first client apparatus 400 from the imaging unit 1040 of the first HMD 105.

In step S504, the combining unit 4050 generates a combined image by combining (superimposing) the virtual object image, which was sent from the server apparatus 420 in step S512, to the real space image acquired in step S503. Then the combining unit 4050 outputs the generated combined image (data thereof) to the first HMD 105. The display unit 1060 of the first HMD 105 displays the combined image based on the data of the combined image outputted from the combining unit 4050.

In step S505, the CPU 201 of the first client apparatus 400 determines whether the processing in FIG. 5 ends. The CPU 201 ends the processing in FIG. 5 if it is determined that the processing in FIG. 5 ends, or returns the processing to step S501 if it is determined that the processing in FIG. 5 does not end.

As described above, according to Embodiment 2 as well, the environment of the surrounding of the client apparatus is considered when the client apparatus generates a virtual object image. Thereby an effect similar to Embodiment 1 can be obtained. Further, according to Embodiment 2, the virtual object image is generated (rendered) by the server apparatus. Thereby the processing load, the processing time, and the manufacturing cost of the client apparatus can be reduced.

Modification 2-1

Just like Modification 1-1, the virtual object generation unit 4030 may generate a virtual object image based on the virtual object information held by the virtual object holding unit 4070, without adjusting the virtual object information. Then the virtual object generation unit 4030 may perform the image processing on the virtual object image based on the real environment information received from the client apparatus, and send the virtual object image after the image processing to the client apparatus.

The virtual object generation unit 4030 may send the virtual object image, on which the real environment information is not reflected, to the client apparatus, without receiving the real environment information from the client apparatus. The virtual object image, on which the real environment information is not reflected, is a virtual object image generated based on the virtual object information that is held by the virtual object holding unit 4070, and is the above mentioned virtual object image before the image processing. In the first client apparatus 400, the communication unit 4010 may receive the virtual object image, on which the real environment information is not reflected, from the server apparatus 420, without sending the real environment information to the server apparatus 420. Further, the first client apparatus 400 may include a processing unit that performs image processing on the virtual object image (virtual object image on which the real environment information is not reflected) based on the real environment information acquired by the real environment information acquisition unit 4020. Then the combining unit 4050 may control so that the virtual object image after the image processing (virtual object image on which the real environment information is reflected) is displayed on the display unit 1060 of the first HMD 105.

In Modification 2-1 as well, the environment of the surrounding of the client apparatus is considered when the client apparatus generates a virtual object image. Thereby an effect similar to Embodiment 1 can be obtained. Further, the virtual object image is generated (rendered) by the server apparatus. Thereby an effect similar to Embodiment 2 can be acquired (that is, processing load, the processing time, and the manufacturing cost of the client apparatus can be reduced).

Modification 2-2

The server apparatus may include one GPU or may include a plurality of GPUs. The plurality of GPUs can execute rendering simultaneously (in parallel). Therefore if the server apparatus includes a plurality of GPUs, the server apparatus can execute rendering of the plurality of virtual object information, which correspond to the plurality of client apparatuses respectively, simultaneously (in parallel). Thereby, the processing time can be reduced. When the user performs operation on a virtual object using a certain client apparatus and the state of the virtual object is changed thereof, the information to indicate the state after the change (at least a part of the virtual object information) is sent from this client apparatus to the server apparatus. Then the server apparatus reflects the received information on all the virtual object information corresponding to the same virtual object (virtual object corresponding to the received information). Thereby, the plurality of client apparatuses can share the virtual object.

Embodiment 3

Embodiment 3 of the present invention will be described. In the following, description on aspects the same as Embodiments 1 and 2 (e.g., configuration and processing the same as Embodiments 1 and 2) will be omitted, and aspect different from Embodiments 1 and 2 will be described.

In Embodiments 1 and 2 described above, the virtual object image is generated based on the real environment information to optically match the real space and the virtual object. In Embodiment 3, in order to optically match the real space and the virtual object, the client apparatus performs image processing on a reality environment image capturing the surrounding of this client apparatus, based not on its own real environment information but on the real environment information of another client apparatus.

Figure 6:
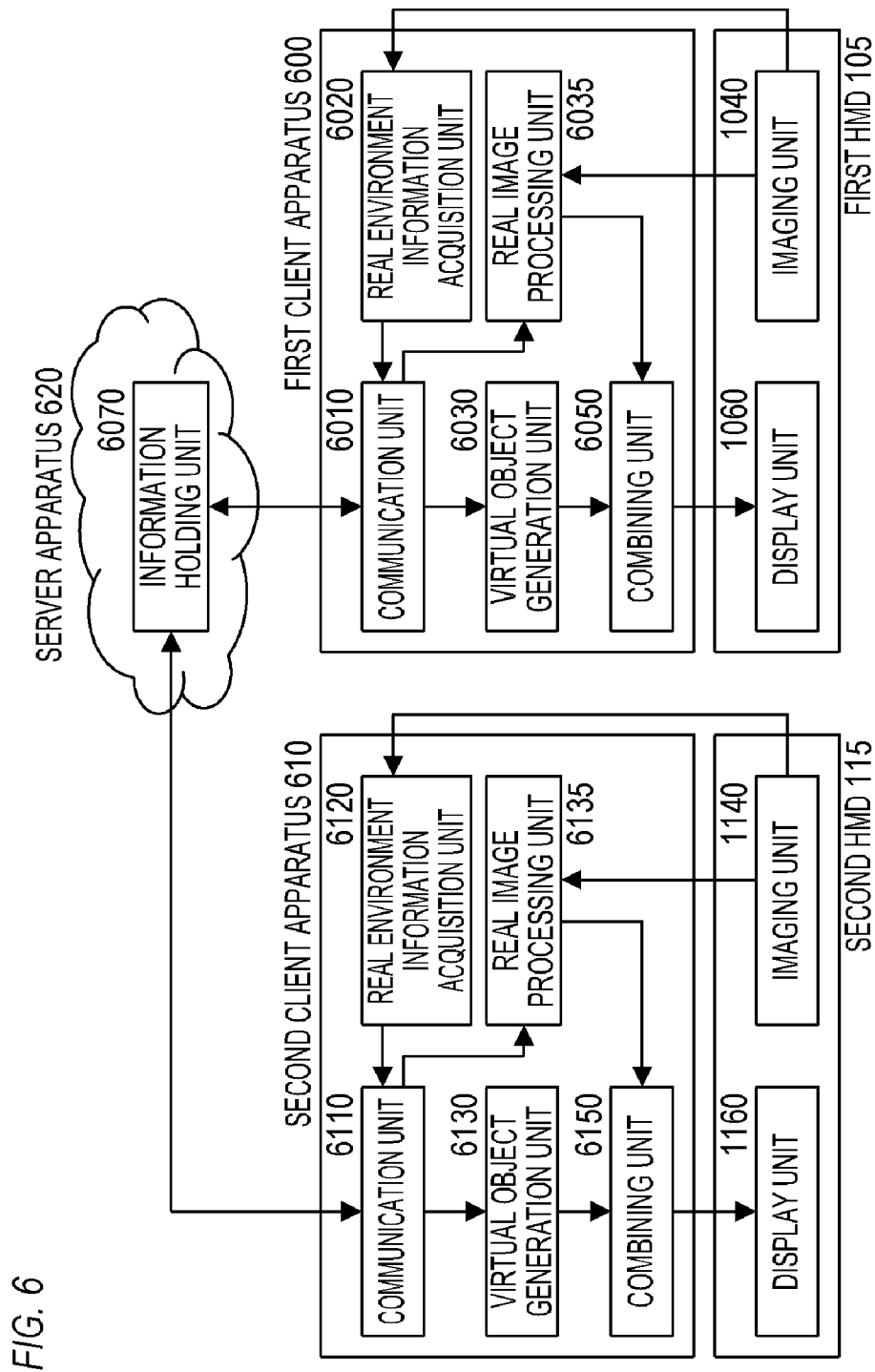
FIG. 6 is a functional block diagram of an information processing system according to Embodiment 3.

FIG. 6 is a functional block diagram of an information processing system according to Embodiment 3. The information processing system in FIG. 6 includes a server apparatus 620, a first client apparatus 600, a second client apparatus 610, the first HMD 105, and the second HMD 115.

The server apparatus 620 includes an information holding unit 6070. The information holding unit 6070 holds virtual object information, just like the virtual object holding unit 1070 of Embodiment 1. The information holding unit 6070 receives real environment information from a client apparatus via a network. When the real environment information is received from the client apparatus, the information holding unit 6070 also receives an ID (identification information) of this client apparatus, and holds the real environment information in association with the ID.

The first client apparatus 600 includes a communication unit 6010, a real environment information acquisition unit 6020, a virtual object generation unit 6030, a real image processing unit 6035, and a combining unit 6050. The real environment information acquisition unit 6020 has a function similar to the real environment information acquisition unit 1020 of Embodiment 1, and the combining unit 1050 has a function similar to the combining unit 6050 of Embodiment 1.

The communication unit 6010 performs communication with the server apparatus 420 via the network, just like the virtual object communication unit 1010 of Embodiment 1. Further, just like the virtual object communication unit 1010 of Embodiment 1, the communication unit 6010 receives the virtual object information from the information holding unit 6070 of the server apparatus 620 via the network. Furthermore, when the first user performs an operation on a virtual object and the state of the virtual object changes, the communication unit 6010 sends the information indicating the state after the change (at least a part of the virtual object information) to the information holding unit 6070 of the server apparatus 620 via the network. The virtual object information held by the information holding unit 6070 is updated based on the information sent from the communication unit 6010.

Moreover, the communication unit 6010 sends the real environment information acquired by the real environment information acquisition unit 6020 and the ID of the first client apparatus 600 to the information holding unit 6070 of the server apparatus 620 via the network. The communication unit 6010 also receives the real environment information of the second client apparatus 610 from the information holding unit 6070 of the server apparatus 620 via the network.

The virtual object generation unit 6030 generates a virtual object image based on the virtual object information received by the communication unit 6010. Unlike the virtual object generation unit 1030 of Embodiment 1, the virtual object generation unit 6030 does not use the real environment information acquired by the real environment information acquisition unit 6020.

The real image processing unit 6035 acquires a real space image capturing the surrounding of the first client apparatus 600 from the imaging unit 1040 of the first HMD 105. Then the real image processing unit 6035 performs image processing on the acquired real space image based on the real environment information of the second client apparatus 610 received by the communication unit 6010.

The second client apparatus 610 has a configuration similar to the first client apparatus 600. Just like the first client apparatus 600, the second client apparatus 610 includes a communication unit 6110, a real environment information acquisition unit 6120, a virtual object generation unit 6130, a real image processing unit 6135, and a combining unit 6150. In Embodiment 3, however, in the virtual object generation unit 6130 of the second client apparatus 610, it is assumed that the virtual object image is generated based on the virtual object information acquired by the communication unit 6110 and the real environment information acquired by the real environment information acquisition unit 6120. In the real image processing unit 6135 of the second client apparatus, it is assumed that the image processing for the real space image is not performed.

Figure 7:
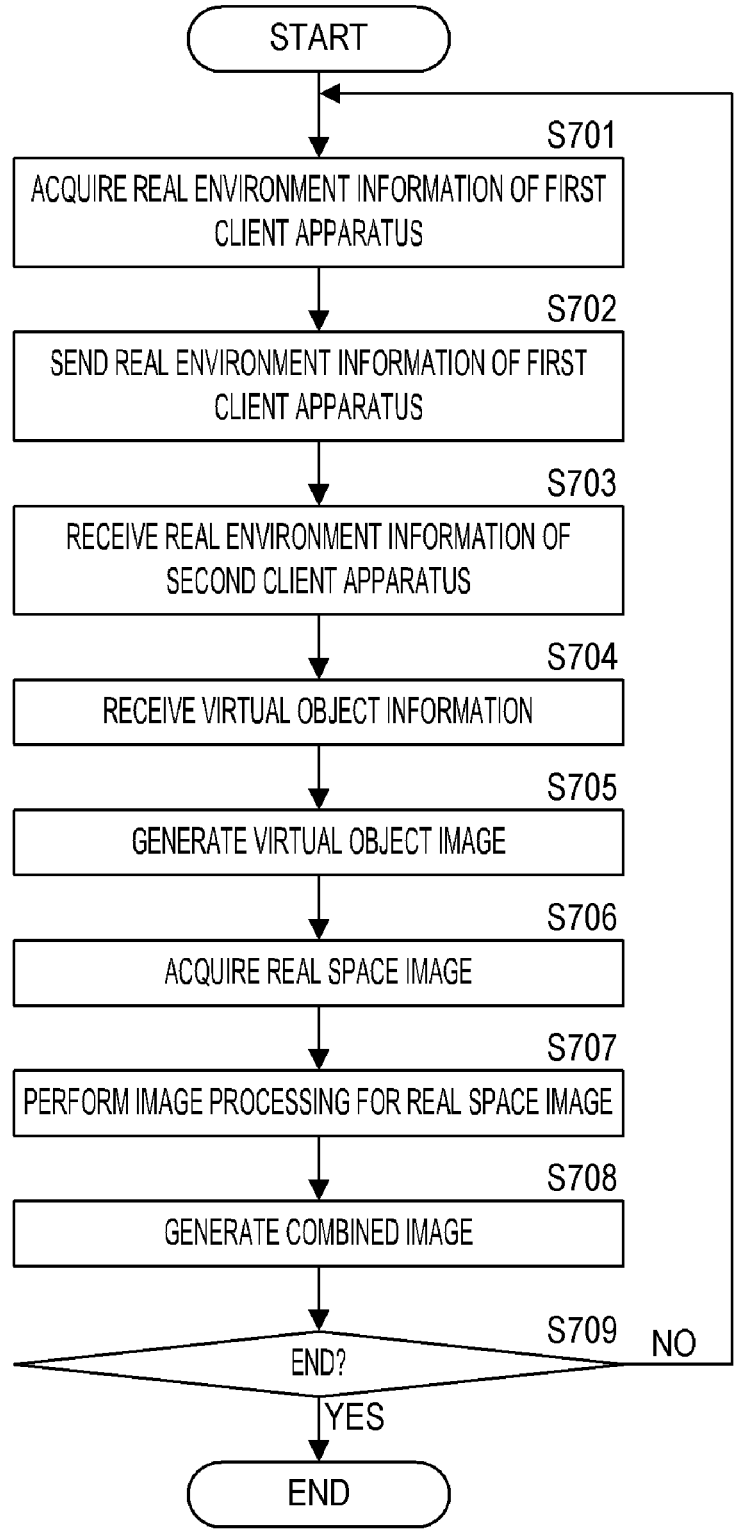
FIG. 7 is a flow chart depicting processing of a client apparatus according to Embodiment 3.

FIG. 7 is a flow chart depicting processing of the first client apparatus 600. The processing in FIG. 7 is implemented by the CPU 201 of the first client apparatus 600 developing a program, which is stored in the ROM 203, in the RAM 202, and executing the program. For example, when the first user performs an operation (executes an instruction) to display a virtual object on the first client apparatus 600, the processing in FIG. 7 starts.

In step S701, the real environment information acquisition unit 6020 acquires the real environment information on the environment of the surrounding (real space) of the first client apparatus 600.

In step S702, the communication unit 6010 sends the real environment information acquired in step S701 and the ID of the first client apparatus 600 to the information holding unit 6070 of the server apparatus 620 via the network. In the same manner, the communication unit 6110 of the second client apparatus 610 sends the real environment information acquired by the real environment information acquisition unit 6120 of the second client apparatus 610 and the ID of the second client apparatus 610 to the information holding unit 6070 of the server apparatus 620.

In step S703, the communication unit 6010 receives the real environment information of the second client apparatus 610 from the information holding unit 6070 of the server apparatus 620 via the network.

In step S704, the communication unit 6010 receives the virtual object information from the information holding unit 6070 of the server apparatus 620 via the network. This virtual object information, for example, is virtual object information generated or updated by the second client apparatus 610.

In step S705, the virtual object generation unit 6030 generates a virtual object image based on the virtual object information received in step S705 and the real environment information of the second client apparatus 610 received in step S703. The method for generating the virtual object image is the same as Embodiment 1. In the case where the real environment information of the second client apparatus 610 is reflected in the virtual object information received in step S705, the virtual object generation unit 6030 need not use the real environment information of the second client apparatus 610. Further, in step S704, the communication unit 6010 may acquire the virtual object image (virtual object image in which the real environment information of the second client apparatus 610 is reflected) from the server apparatus 620, just like Embodiment 2. In this case, the processing in step S705 is unnecessary.

In step S706, the real image processing unit 6035 acquires the real space image capturing the surrounding of the first client apparatus 600 from the imaging unit 1040 of the first HMD 105.

In step S707, the real image processing unit 6035 performs image processing on the real space image acquired in step S706, based on the real environment information of the second client apparatus 610 received in step S703. The image processing is not especially limited. For example, the real image processing unit 6035 may change the luminance (brightness value) of the real space image in accordance with the luminance of the environment included in the real environment information. The brightness value of the real space image can be increased to brighten the real space image, and the brightness value of the real space image can be decreased to darken the real space image. The real image processing unit 6035 may change the brightness value of a part of the real space image in accordance with the position and intensity of the light source included in the real environment information. Further, the real image processing unit 6035 may change a tinge (e.g., balance of R value, G value and B value) of the real space image in accordance with the color temperature of the light source included in the real environment information.

In step S708, the combining unit 6050 generates a combined image by combining (superimposing) the virtual object image generated in step S705 to the real space image after the image processing in step S707. Then the combining unit 6050 outputs the generated combined image (data thereof) to the first HMD 105. The display unit 1060 of the first HMD 105 displays the combined image based on the data of the combined image outputted from the combining unit 6050.

In step S709, the CPU 201 of the first client apparatus 600 determines whether the processing in FIG. 7 ends. The CPU 201 ends the processing in FIG. 7 if it is determined that the processing in FIG. 7 ends, or returns the processing to step S701 if it is determined that the processing in FIG. 7 does not end.

As described above, according to Embodiment 3, image processing based on the real environment information of another client apparatus is performed on the real space image capturing the surrounding of a specific client apparatus. Thereby a plurality of users at different locations can view the virtual object appropriately in an environment similar to the environment of the surrounding of the specific client apparatus. If a virtual object image, in which the virtual object is optically matched with the environment of the surrounding of the specific client apparatus, is generated, a plurality of users can view the virtual object without feeling a sense of discomfort.

The above mentioned embodiments (including modifications) are merely examples, and configurations acquired by appropriately modifying or changing the above mentioned configurations within the scope of the spirit of the present invention are also included in the present invention. The configurations acquired by appropriately combining the above mentioned configurations are also included in the present invention.

According to the present invention, a plurality of users at different locations can view the virtual object appropriately.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-124671, filed on Aug. 4, 2022, which is hereby incorporated by reference herein in its entirety.

What is claimed is:

1. An information processing apparatus that is a first client apparatus connected to a network, the information processing apparatus comprising:
   a receiver configured to receive first information, which is information on a virtual object, via the network; and
   a controller configured to (1) acquire second information, which is information on an environment of surrounding of the first client apparatus, (2) generate a first image of the virtual object on a basis of the first information and the second information, and (3) control so that the generated first image of the virtual object is displayed on a first display,
   wherein, for a second client apparatus which is placed in an environment of surrounding different from that of the first client apparatus, (1) a second image of the virtual object is generated on a basis of the first information and information on that environment and (2) the second image is displayed on a second display by the second client apparatus, and
   wherein the controller (1) generates the first image of the virtual object on a basis of the first information without using the second information in a case where a difference between the environment of surrounding of the first client apparatus and the environment of surrounding of the second client apparatus is not larger than a threshold, and (2) generates the first image of the virtual object on a basis of the first information and the second information in a case where the difference between the environment of surrounding of the first client apparatus and the environment of surrounding of the second client apparatus is larger than the threshold.

2. The information processing apparatus according to claim 1, wherein the controller further (1) acquires a real space image capturing the surrounding of the first client apparatus, and (2) controls so that a combined image superimposing the first image of the virtual object on the real space image is displayed on the first display.

3. The information processing apparatus according to claim 2, wherein the second information includes exposure information of an image sensor, which captures the surrounding of the client apparatus, or the real space image.

4. The information processing apparatus according to claim 2, wherein the controller acquires the second information at a frequency lower than a frame rate of the real space image.

5. The information processing apparatus according to claim 1, wherein the second information includes at least one of a position of a light source in the environment, an intensity of the light source, a color temperature of the light source, an environment map indicating the environment, and a luminance of the environment.

6. The information processing apparatus according to claim 1, wherein the first information includes a same type of information as the second information.

7. The information processing apparatus according to claim 1, wherein in a case where the first image of the virtual object is generated on a basis of the first information and the second information, the controller adjusts the first information on a basis of the second information, and generates the first image of the virtual object on a basis of the first information after the adjustment.

8. The information processing apparatus according to claim 1, wherein in a case where the first image of the virtual object is generated on a basis of the first information and the second information, the controller (1) generates an image of the virtual object on a basis of the first information, (2) performs image processing on the image of the virtual object on a basis of the second information, and (3) controls so that the first image which is the image of the virtual object after the image processing is displayed on the first display.

9. The information processing apparatus according to claim 1, wherein the receiver is a communication interface configured to receive the first information from a server apparatus via the network,
   wherein the controller changes a state of the virtual object in response to an instruction from a user, and
   wherein the communication interface transmits third information, which is information on the virtual object after the state has been changed, to the server apparatus via the network.

10. An information processing apparatus that is a first client apparatus connected to a network, the information processing apparatus comprising:
    a receiver configured to receive first information, which is information on a virtual object, via the network; and
    a controller configured to (1) acquire second information, which is information on an environment of surrounding of the first client apparatus, (2) generate a first image of the virtual object on a basis of the first information and the second information, and (3) control so that the generated first image of the virtual object is displayed on a first display,
    wherein, for a second client apparatus which is placed in an environment of surrounding different from that of the first client apparatus, (1) a second image of the virtual object is generated on a basis of the first information and information on that environment and (2) the second image is displayed on a second display by the second client apparatus, and wherein the controller controls so that a predetermined notification is performed to a user of the first client apparatus in a case where a difference between the environment of surrounding of the first client apparatus and the environment of surrounding of the second client apparatus is larger than a threshold.

11. An image processing apparatus that is a server apparatus connected to a network, the image processing apparatus comprising:

a receiver configured to receive second information, which is information on an environment of surrounding of a first client apparatus connected to the network, via the network;

a controller configured to (1) acquire first information, which is information on a virtual object, and (2) generate a first image of the virtual object on a basis of the first information and the second information; and a transmitter configured to transmit the first image of the virtual object generated by the controller to the first client apparatus via the network, wherein, for a second client apparatus which is placed in an environment of surrounding different from that of the first client apparatus, (1) a second image of the virtual object is generated on a basis of the first information and information on that environment and (2) the second image is displayed on a second display by the second client apparatus, and wherein the controller (1) generates the first image of the virtual object on a basis of the first information without using the second information in a case where a difference between the environment of surrounding of the first client apparatus and the environment of surrounding of the second client apparatus is not larger than a threshold, and (2) generates the first image of the virtual object on a basis of the first information and the second information in a case where the difference between the environment of surrounding of the first client apparatus and the environment of surrounding of the second client apparatus is larger than the threshold.

12. A control method of a first client apparatus connected to a network, the control method comprising:

receiving first information, which is information on a virtual object, via the network;

acquiring second information, which is information on an environment of surrounding of the first client apparatus;

generating a first image of the virtual object on a basis of the first information and the second information; and controlling so that the generated first image of the virtual object is displayed on a first display, wherein, for a second client apparatus which is placed in an environment of surrounding different from that of the first client apparatus, (1) a second image of the virtual object is generated on a basis of the first information and information on that environment and (2) the second image is displayed on a second display by the second client apparatus, and wherein (1) the first image of the virtual object is generated on a basis of the first information without using the second information in a case where a difference between the environment of surrounding of the first client apparatus and the environment of surrounding of the second client apparatus is not larger than a threshold, and (2) the first image of the virtual object is generated on a basis of the first information and the second information in a case where the difference between the environment of surrounding of the first client apparatus and the environment of surrounding of the second client apparatus is larger than the threshold.

13. A non-transitory computer-readable medium that stores a program, wherein the program causes a computer to execute the control method according to claim 12.

14. An image processing apparatus that is a server apparatus connected to a network, the image processing apparatus comprising:

a receiver configured to receive second information, which is information on an environment of surrounding of a first client apparatus connected to the network, via the network;

a controller configured to (1) acquire first information, which is information on a virtual object, and (2) generate a first image of the virtual object on a basis of the first information and the second information; and a transmitter configured to transmit the first image of the virtual object generated by the controller to the first client apparatus via the network, wherein, for a second client apparatus which is placed in an environment of surrounding different from that of the first client apparatus, (1) a second image of the virtual object is generated on a basis of the first information and information on that environment and (2) the second image is displayed on a second display by the second client apparatus, and wherein the controller controls so that a predetermined notification is performed to a user of the first client apparatus in a case where a difference between the environment of surrounding of the first client apparatus and the environment of surrounding of the second client apparatus is larger than a threshold.

15. A control method of a first client apparatus connected to a network, the control method comprising:

receiving first information, which is information on a virtual object, via the network;

acquiring second information, which is information on an environment of surrounding of the first client apparatus;

generating a first image of the virtual object on a basis of the first information and the second information; and controlling so that the generated first image of the virtual object is displayed on a first display, wherein, for a second client apparatus which is placed in an environment of surrounding different from that of the first client apparatus, (1) a second image of the virtual object is generated on a basis of the first information and information on that environment and (2) the second image is displayed on a second display by the second client apparatus, and wherein it is controlled so that a predetermined notification is performed to a user of the first client apparatus in a case where a difference between the environment of surrounding of the first client apparatus and the environment of surrounding of the second client apparatus is larger than a threshold.

16. A non-transitory computer-readable medium that stores a program, wherein the program causes a computer to execute the control method according to claim 15.

* * * * *